United States Patent
Gruttadauria et al.

(10) Patent No.: US 8,086,760 B1
(45) Date of Patent: Dec. 27, 2011

(54) MANAGING COMMUNICATIONS CONNECTIONS WITH DATA STORAGE SYSTEMS

(75) Inventors: Brian R. Gruttadauria, Sutton, MA (US); Paula Emily McAdam, Shrewsbury, MA (US); Qing Shou, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 186 days.

(21) Appl. No.: 11/239,037

(22) Filed: Sep. 29, 2005

(51) Int. Cl.
*G06F 3/00* (2006.01)

(52) U.S. Cl. .................................. 710/8; 710/16; 710/17

(58) Field of Classification Search .................. 710/1, 8, 710/15, 16, 17
See application file for complete search history.

(56) References Cited

U.S. PATENT DOCUMENTS

| | | | |
|---|---|---|---|
| 7,072,986 B2 * | 7/2006 | Kitamura et al. | 709/249 |
| 7,130,900 B2 * | 10/2006 | Shiga et al. | 709/223 |
| 7,287,269 B2 * | 10/2007 | Burton et al. | 726/2 |
| 7,617,318 B2 * | 11/2009 | Shiga et al. | 709/228 |

OTHER PUBLICATIONS

Deploying IP SANs with the Microsoft iSCSI Architecture; Jul. 2004; pp. 1-21.*
Microsoft iSCSI Software Initiator 2.x Users Guide; Jun. 2005; Microsoft Corporation; pp. 1-40.*
Microsoft iSCSI Software Initiator 1.05 Users Guide; Dec. 2, 2004; pp. 1-38; Retrieved from http://ftp.ren.nic.in/pub/Windows/Utils/Drivers/Microsoft%20iSCSI%20Software%20Initiator%20Version%201.05a%20%28build%20279%29/ on Feb. 23, 2011.*

* cited by examiner

*Primary Examiner* — Alford Kindred
*Assistant Examiner* — Richard B Franklin
(74) *Attorney, Agent, or Firm* — Krishnendu Gupta; Jason A. Reyes; Deepika Bhayana

(57) ABSTRACT

Communications connections with data storage systems are managed. A discovery process is executed to identify an iSCSI port on data storage system. Settings for the iSCSI port are accepted as user input at a server. Communication is performed from the server to the data storage system to configure the iSCSI port.

12 Claims, 19 Drawing Sheets

MANAGING COMMUNICATIONS CONNECTIONS WITH DATA STORAGE SYSTEMS

BACKGROUND

This application relates to managing communications connections with data storage systems.

Computer systems may include different resources used by one or more host processors. Resources and host processors in a computer system may be interconnected by one or more communication connections. These resources may include, for example, data storage systems, such as the SYMMETRIX and CLARIION families of data storage systems manufactured by EMC Corporation. These data storage systems may be coupled to one or more host processors and provide storage services to each host processor. An example data storage system may include one or more data storage devices, such as those of the CLARIION family, that are connected together and may be used to provide common data storage for one or more host processors in a computer system.

A host processor may perform a variety of data processing tasks and operations using the data storage system. For example, a host processor may perform basic system I/O operations in connection with data requests such as data read and write operations. Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units neither may or may nor correspond to the actual disk drives. Allowing multiple host systems to access the single storage device unit allows the host systems to share data stored therein.

It is desirable to manage and monitor data storage systems for a variety of different reasons, such as, for example, to obtain configuration data and/or performance data. System configuration information may be obtained in connection with a system configuration modification such as, for example, a logical or physical device reconfiguration.

A data storage system to be managed and monitored may use the internet Small Computer System Interface (iSCSI) protocol, which is based on Small Computer System Interface (SCSI) and Transmission Control Protocol (TCP) protocols which are well known within the art of computer science. In brief, SCSI is a standard specifying the interface between devices that were originally controllers and peripherals in computer systems. The SCSI architecture is a client-server architecture wherein clients and servers are called "initiators" and "targets," respectively. Initiators send service requests to targets and receive responses from targets.

A target is a collection of logical units. Each logical unit contains a device server, one or more task sets (queues), and a task manager.

SCSI recognizes two types of requests: device-server requests and task-management requests. The device server processes the device-server commands while the task manager is responsible for task management.

A device-server request is a SCSI command for execution on a logical unit, such as a block read/write command. Each device-server request defines a unit of work for a logical unit. Within a logical unit, a task represents a unit of work.

A SCSI task is an execution context a target creates for a SCSI command or a series of linked SCSI commands. A new task is created for each single command, while the same task is used for all the commands in a series of linked commands, also referred to as a "chain of commands." A task persists until a command (or a series of linked commands) completion response is sent or until the task is ended by a task management function or exception condition. The initiator sends the next linked command in a series of linked commands only after the current command completes. That is, only one pending command exists per task. From the initiator's point of view, the device server is not multi-tasking; a task executes until it completes. This property allows initiators to implement, for example, read-modify-write commands using linked commands.

Task management requests control the execution of tasks. Examples of task management requests include aborting a task, clearing an exception condition and resetting a logical unit. The task manager manages task queues and serves task management requests.

Both initiators and targets have ports to communicate with their counterparts. The requests and responses are sent through and received from these ports. An initiator or target has one or more ports. Each port has a unique identifier. Each request includes its initiator and target port identifiers. These identifiers are in a "nexus object" in the request. In addition, the nexus object optionally contains an identifier for the logical unit and the task. The logical unit identifier is included if the request is destined for a particular logical unit. Similarly, the task identifier is included if the request is for a specified task.

SCSI is described more fully in the SCSI-3 Architecture Model (SAM) and in the SCSI Architecture Model-2 (SAM-2), available from the American National Standards Institute in Washington, D.C.

The iSCSI protocol maps the SCSI remote procedure invocation model over the TCP protocol. iSCSI requests carry SCSI commands, and iSCSI responses carry SCSI responses and status. iSCSI also uses the request-response mechanism for iSCSI protocol mechanisms.

iSCSI is described more fully in iSCSI, available from The Internet Engineering Task Force.

With the advent of iSCSI, data storage systems may be linked to facilitate the formation of Storage Area Networks (SANs) having increased capabilities and improved performance. SANs that include servers and data storage devices may be interconnected over longer distances, e.g. over IP networks, such as the Internet. For example, iSCSI may be supported over physical media that supports TCP/IP as a transport, and iSCSI implementations may be on Gigabit Ethernet, supporting speeds of at least 10 Gbyte/sec.

iSCSI, more particularly, comprises the rules and processes to transmit and receive block storage applications over TCP/IP networks, and particularly the iSCSI protocol enables SCSI commands to be encapsulated in TCP/IP packets and delivered over IP networks. Thus, implementing SCSI commands over IP networks may be used to facilitate block-level data transfers over Intranets, local area networks (LANs), wide area networks (WANs), the Internet, and the like, and can enable location-independent data storage and retrieval, e.g., at remote workstations or devices.

Each iSCSI device (target or initiator) is allocated a unique name and address. There are two standards which can be employed for iSCSI device naming; EUI (Enterprise Unique Identifier) or IQN (iSCSI Qualified Name). A fully qualified IQN includes the iSCSI target's name and an identifier for the shared iSCSI node or logical volume ("LUN").

Several discovery methods can be implemented in an iSCSI environment. The administrator can manually specify IP addresses and IQN names to the initiator and target devices. Alternatively, the initiator can use a SendTargets operation to discover targets, such that the address of a target device is specified manually and the initiator establishes a discovery session to perform the SendTargets operation. The target device responds by sending a complete list of additional targets that are available to the initiator. This method is semi-automated, such that the administrator may still need to enter a range of target addresses. Internet Storage Name Service (iSNS) provides a discovery method for both naming and resource discovery for devices on an IP based SAN. The iSNS protocol uses an iSNS server as the central location for tracking information about targets and initiators. An iSNS server can be run on any host, initiator, or target on the SAN. An iSNS client is required on each initiator or target to enable communication with the iSNS Server. In the initiator, the iSNS client registers the initiator and queries the list of targets. In the target, the iSNS client registers the target with the server.

For an initiator to transmit information to a target, the initiator must first establish a session with the target through an iSCSI logon process. This process starts the TCP/IP connection, verifies that the initiator has access to the target (authentication), and allows negotiation of various parameters including the type of security protocol to be used, and the maximum data packet size. If the logon is successful, an ID is assigned to both initiator (an initiator session ID, or ISM) and target (a target session ID, or TSID). Thereafter, the full feature phase—which allows for reading and writing of data—can begin. Multiple TCP connections can be established between each initiator target pair, allowing unrelated transactions during one session. Sessions between the initiator and its storage devices generally remain open, but logging out is available as an option.

Since iSCSI operates in the Internet environment, security can be important. The iSCSI protocol specifies the use of IP security (IPsec) to help ensure that the communicating end points (initiator and target) are authentic, the transferred data has been secured through encryption and is thus kept confidential, data integrity is maintained without modification by a third party, and data is not processed more than once, even if it has been received multiple times. The iSCSI protocol also specifies that Challenge Handshake Authentication Protocol (CHAP) be implemented to further authenticate end node identities.

Installation of a data storage system such as an iSCSI based data storage system can be a complicated process, particularly for the user. For example, initializing a new iSCSI based data storage system and connecting a server to an iSCSI storage system can involve complicated tasks requiring the user to execute and navigate multiple stand-alone software utilities, typically on both the storage system and the server to be connected.

For example, a MICROSOFT iSCSI initiator software package runs on various MICROSOFT WINDOWS operating systems. The package includes several software components, including MICROSOFT Initiator and MICROSOFT Initiator Service. MICROSOFT Initiator is an iSCSI device driver component that is responsible for moving data from a storage stack to a standard network stack. MICROSOFT Initiator is used only when iSCSI traffic goes over standard network adapters (also referred to as network interface cards, or NICs), not when specialized iSCSI adapters are used. MICROSOFT Initiator Service is a service that manages all iSCSI initiators (including network adapters and host bus adapters (HBAs)) on behalf of the operating system. Its functions include aggregating discovery information and managing security. It includes an iSNS client, including functionality used for device discovery.

MICROSOFT Initiator functions with a network stack (iSCSI over TCP/IP) and supports both standard Ethernet network adapters and TCP/IP offloaded network adapters. MICROSOFT Initiator Service provides storage management functionality including discovery and aggregation of multiple discovery mechanisms (iSNS, SendTarget, and manual configuration by an administrator), security and iSNS server and client support for security credentials, session initiation and termination and parameter settings for iSCSI sessions, and device management including providing HBA or network adapter-based initiators with the necessary parameters.

MICROSOFT Initiator Service enables the host computer system to discover target storage devices on the storage area network and to determine whether or not it has access to those devices. iSNS client code of MICROSOFT Initiator Service allows the Service to maintain a list of targets reported via the iSNS server as changes are made.

MICROSOFT Initiator, in accordance with iSCSI standards, uses IPsec for encryption and CHAP for authentication.

MICROSOFT Initiator Service has a common application programming interface (API) that can be used for configuring both MICROSOFT Initiator and iSCSI HBAs.

SUMMARY OF THE INVENTION

Communications connections with data storage systems are managed. A discovery process is executed to identify an iSCSI port on data storage system. Settings for the iSCSI port are accepted as user input at a server. Communication is performed from the server to the data storage system to configure the iSCSI port.

One or more implementations of the invention may provide one or more of the following advantages. Installation of a data storage management system can be simplified, particularly for the user. Initializing and connecting an iSCSI data storage system can be done using a single software wizard, which can reduce or eliminate the need for paper-based guides or on-line or customer service assistance.

Other advantages and features will become apparent from the following description, including the drawings, and from the claims.

DETAILED DESCRIPTION

Figure 1:
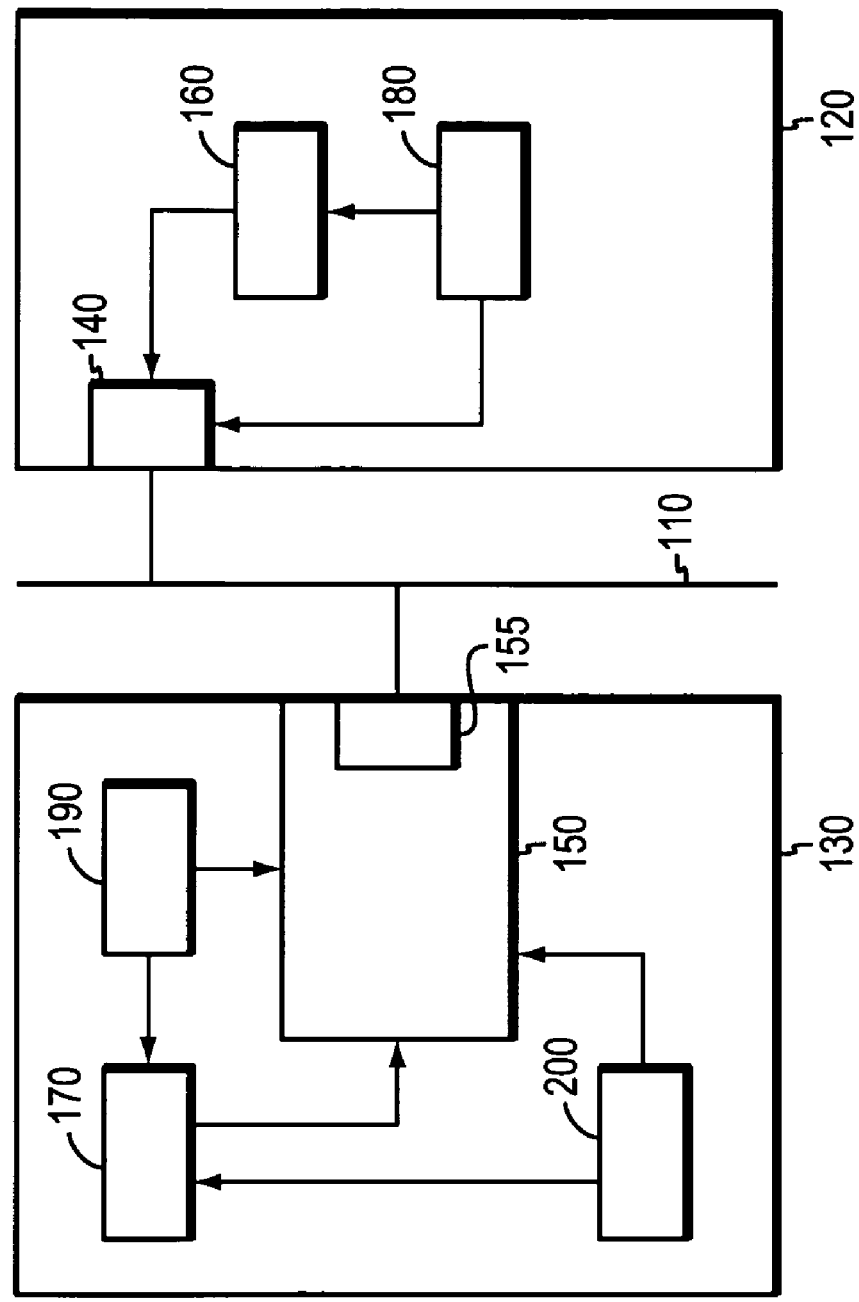
FIG. 1 is a block diagram of a computer system having a network connected data storage system.

FIG. 1 illustrates a computer system 100 in which a network 110 connects a data storage system 120 to a server 130.

The data storage system has at least one network port 140 and the server has a network interface 150 that includes at least one network port 155. The data storage system has iSCSI logic 160 controlling port 140. In a specific implementation, the server runs MICROSOFT Initiator software 170 that uses interface 150 to provide iSCSI functionality at the server, and the data storage system may be or include an EMC CLARIION AX100 and logic 160 may be or include storage management software (e.g., EMC NAVISPHERE) or may be driven by such software 180 as illustrated in FIG. 1. Server 130 may also include a server tool 190 and an initialization tool 200 driving software 170 and interface 150 as described below.

An interactive sequence is executed for installation and configuration of iSCSI functionality on the data storage system. A corresponding flow of operations and data is described below for both the initialization of the storage system and the configuration of initiators on the server. In general, each initiator is a host network interface card (NIC) or host bus adapter (HBA), such as interface 150, that initiates a connection with the data storage system, and is identified by a unique initiator name, and in the case of an HBA, the HBA is on a host used to communicate with the data storage system. In the specific implementation, interface 150 driven by the MICROSOFT Initiator software serves as an initiator.

As described below, the iSCSI methods described herein facilitate a user's procedure of initializing the storage system as well as connecting the server to the storage system. In particular, the methods facilitate such a procedure executed by the person responsible for network administration and management of the storage system.

In at least one embodiment, the methods help the user avoid executing at least part of a conventional procedure that includes directly interacting with multiple stand-alone utilities including the MICROSOFT Initiator software and storage system management software, on both the storage system and the server to be connected. In particular, the methods described herein help reduce the number of applications the user needs to launch and helps simplify organizing where the applications are run.

An initialization tool (e.g., tool 200) referred to as NAVISPHERE Storage System Initialization wizard is used to initialize the storage system. Wizard functionality as described herein helps provide an ability to configure the storage system's iSCSI ports. FIGS. 2-7 illustrate samples of user interface displays used to initialize an iSCSI storage system in connection with the steps described below.

Figure 2:
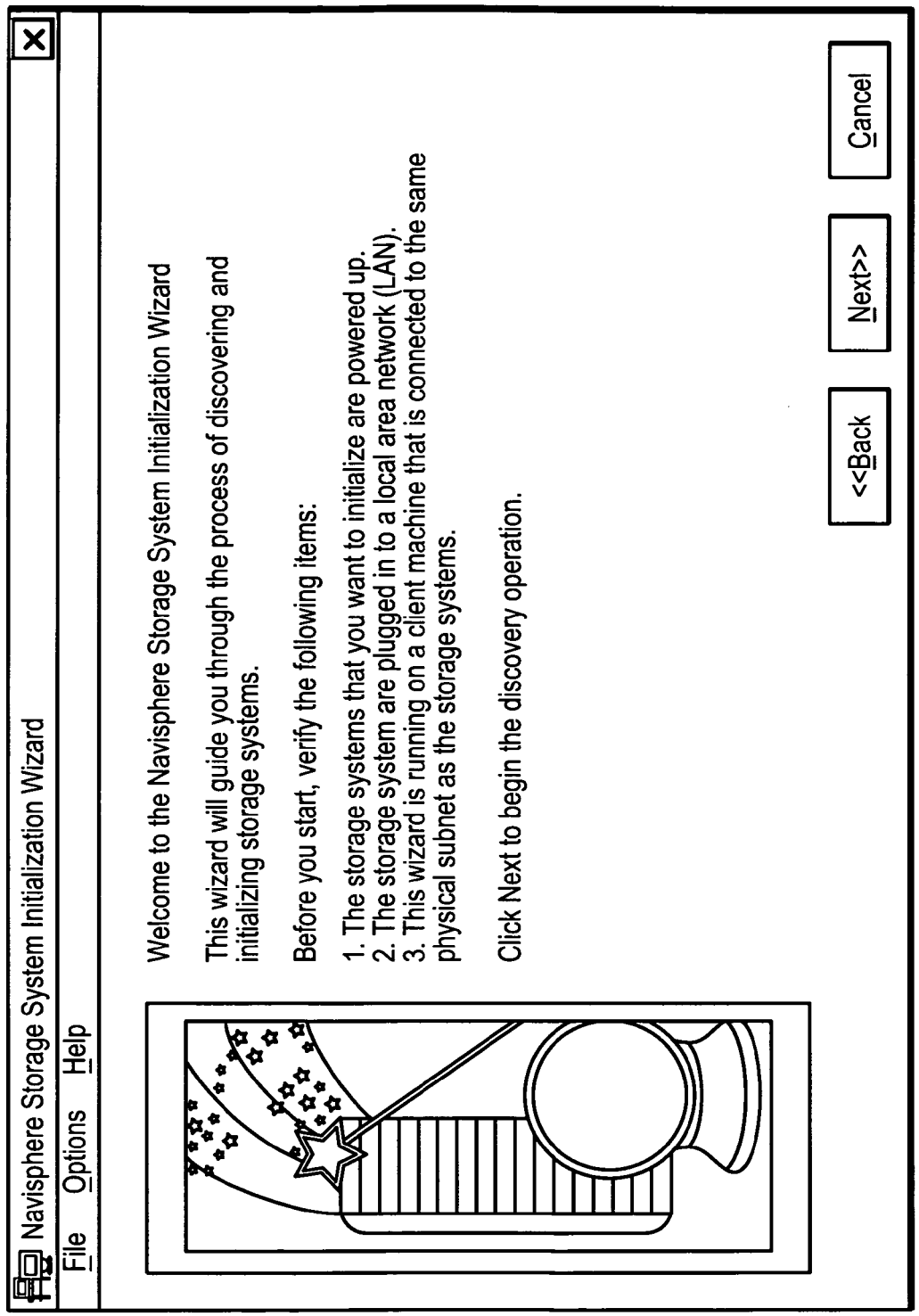
FIGS. 2-16 are illustrations of graphical user interface screens for use in the computer system.
Figure 17:
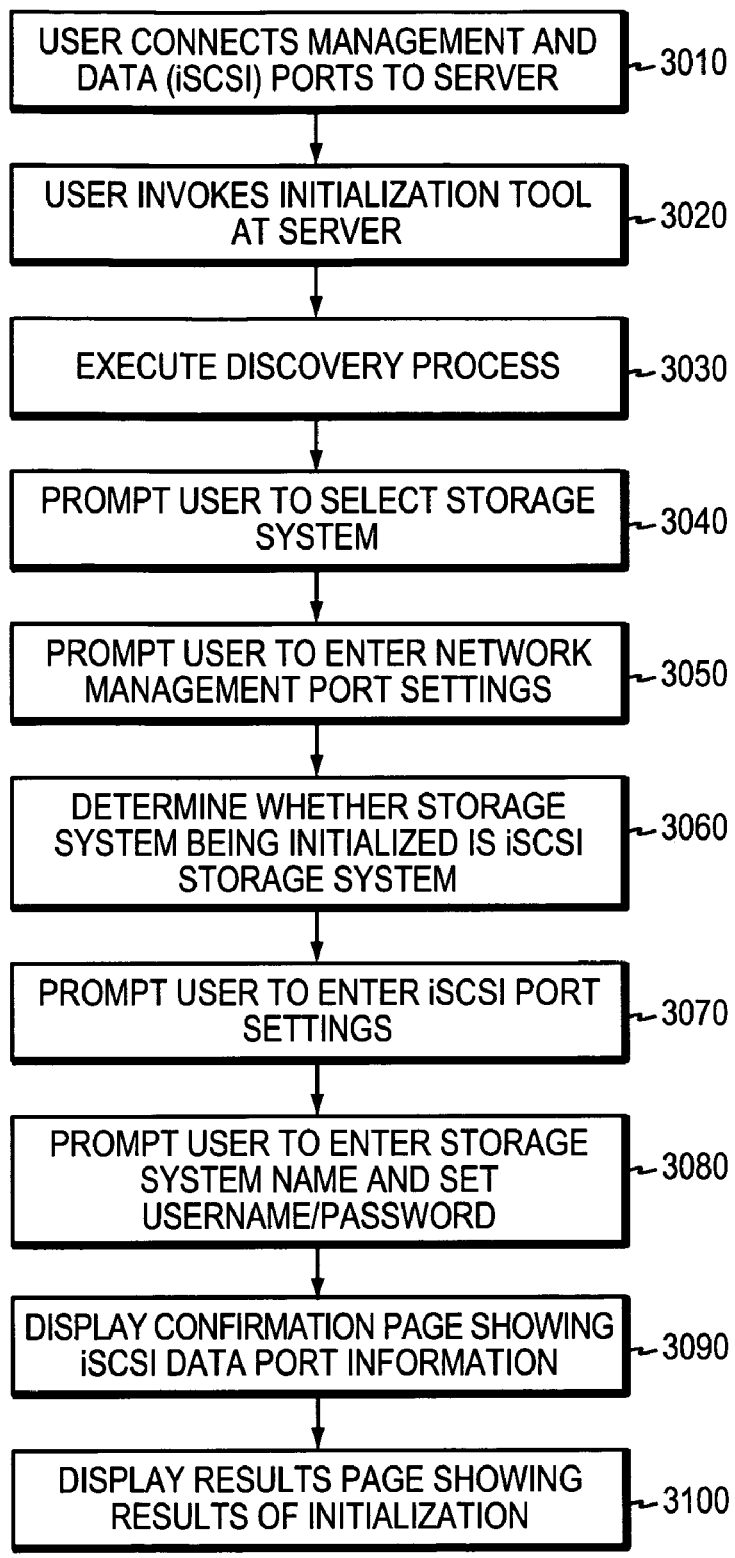
FIGS. 17-18B are flow diagrams of procedures for use in the computer system.

With respect to FIG. 17, the user connects management and data (iSCSI) ports to the server (step 3010). The user invokes the initialization tool at the server (step 3020). FIG. 2 illustrates a sample display having text prompting the user that, in the case of an iSCSI initialization, cabling the iSCSI data ports will allow the wizard to check data port connectivity.

Figure 3:
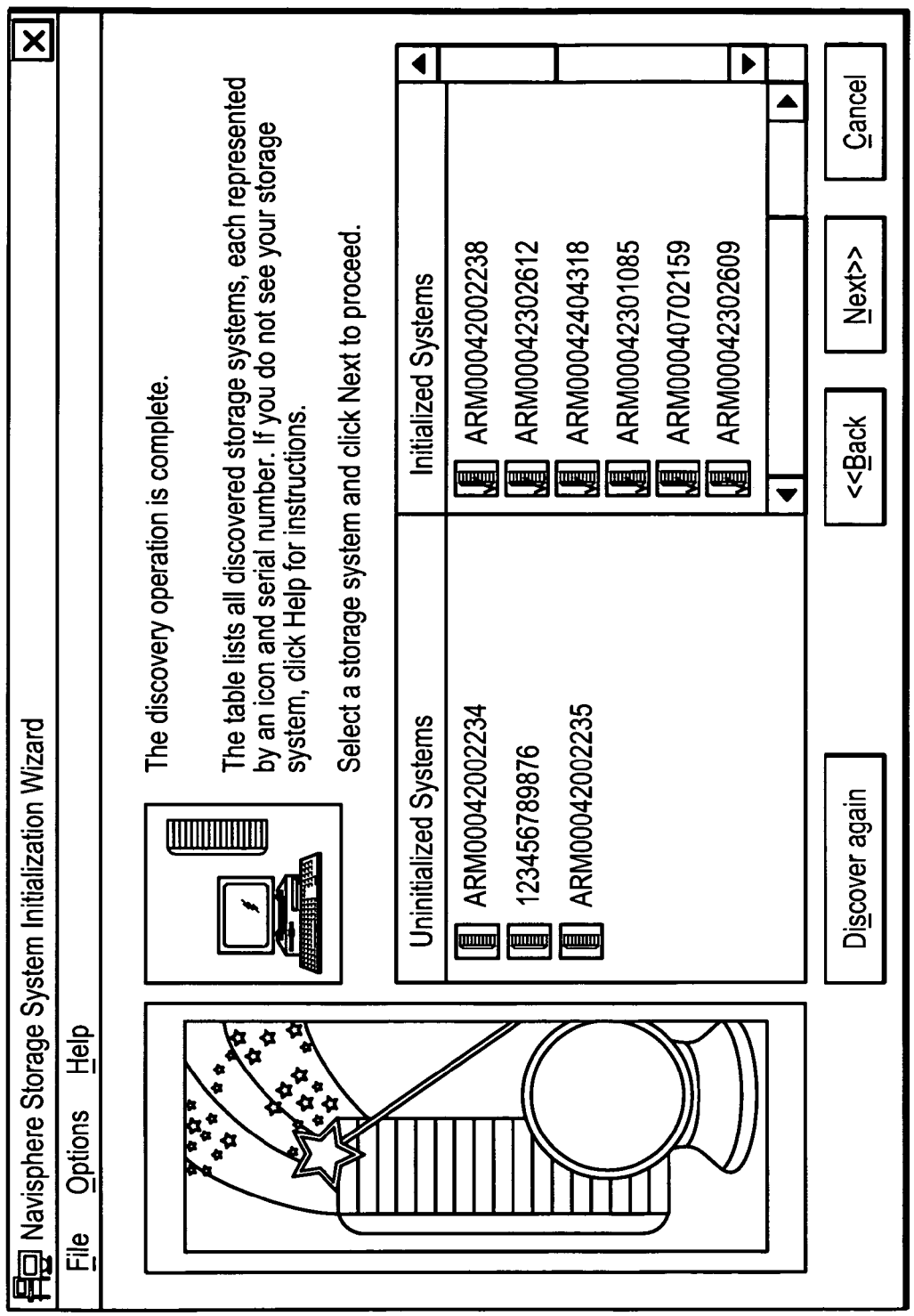

The wizard executes a discovery process (step 3030) during which a wait cursor is shown and text is displayed indicating to the user that discovery is in progress. In the discovery process, storage systems on the network are discovered. When the discovery progress is completed, a discovery page (e.g., as shown in FIG. 3) is displayed. The user can select a storage system (step 3040) and press a 'Next' button to continue.

Figure 4:
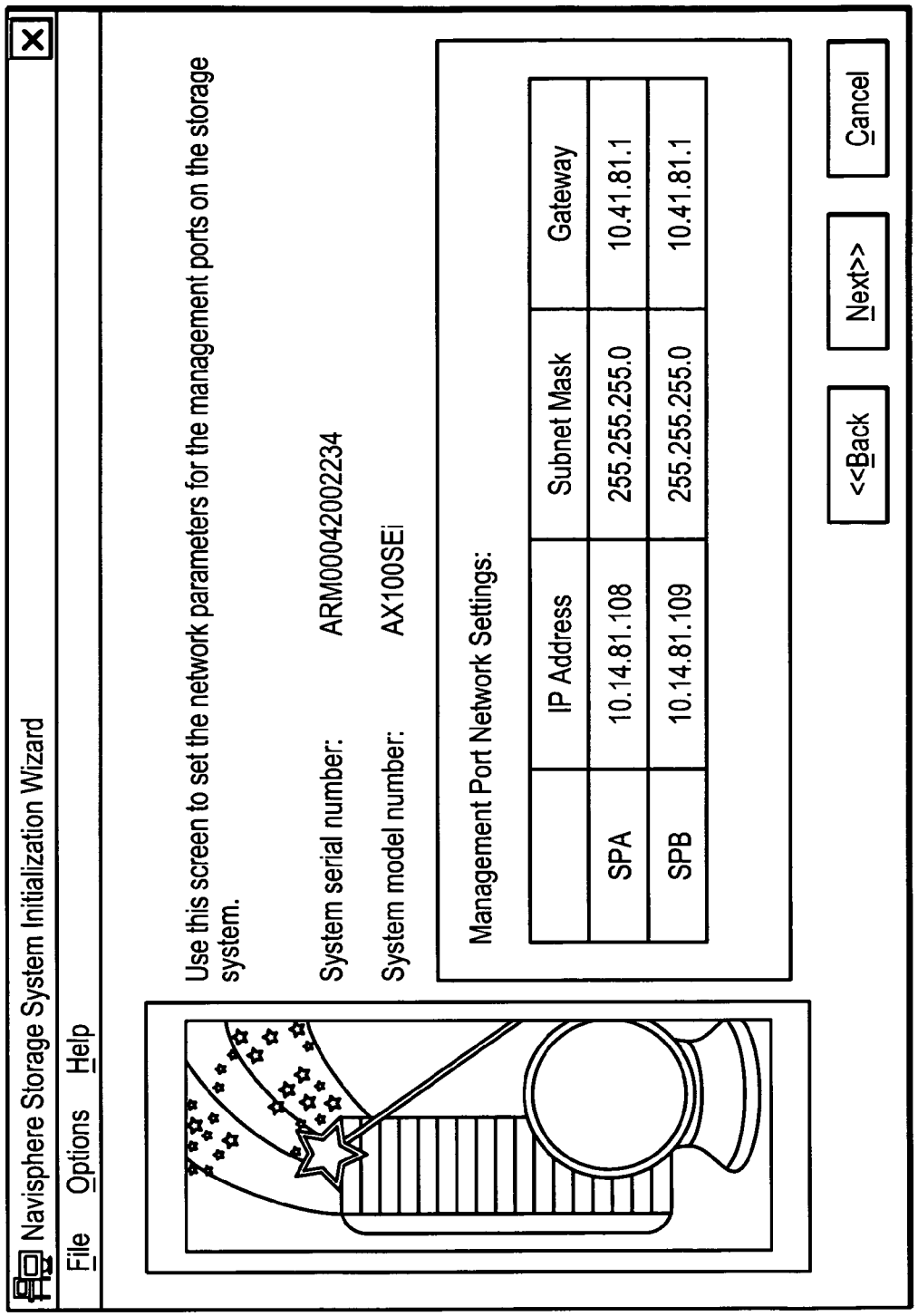

A management port setting page (e.g., as shown in FIG. 4) is displayed, and prompts the user to enter network management port settings (step 3050), e.g., via a table on the page. In at least one embodiment, such a table may accommodate additional port settings if needed, and a page is displayed to show a diagram of the management ports.

Figure 5:
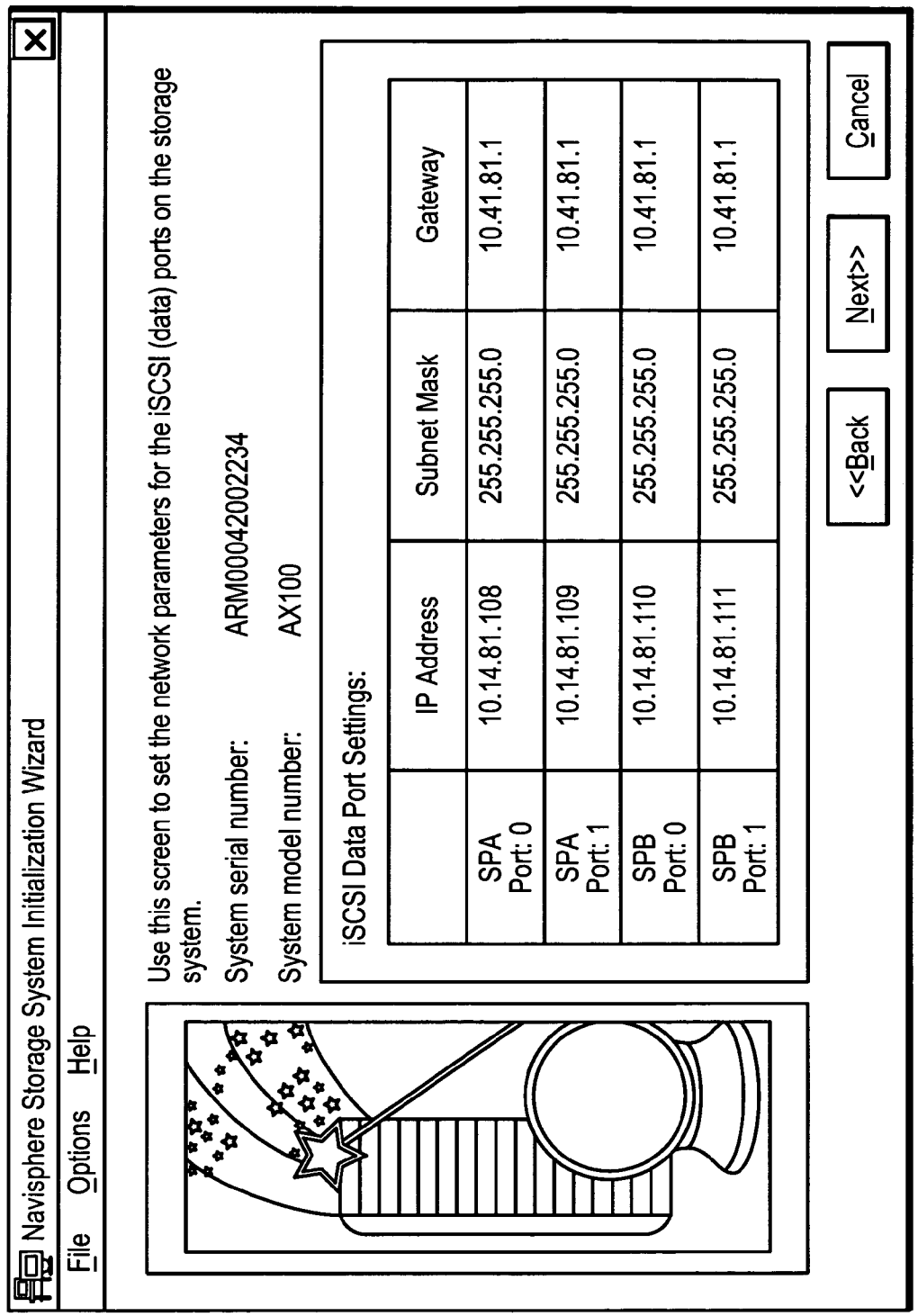

The wizard determines whether the storage system being initialized is an iSCSI storage system (step 3060). If so, an iSCSI port settings page (e.g., as shown in FIG. 5) is shown after the user has entered the management port settings on the previous page. The user enters the iSCSI port settings (step 3070), e.g., via a table on the page. In at least one embodiment, the table can accommodate additional data ports as needed, and a page is provided to show a diagram of the iSCSI data ports.

Figure 6:
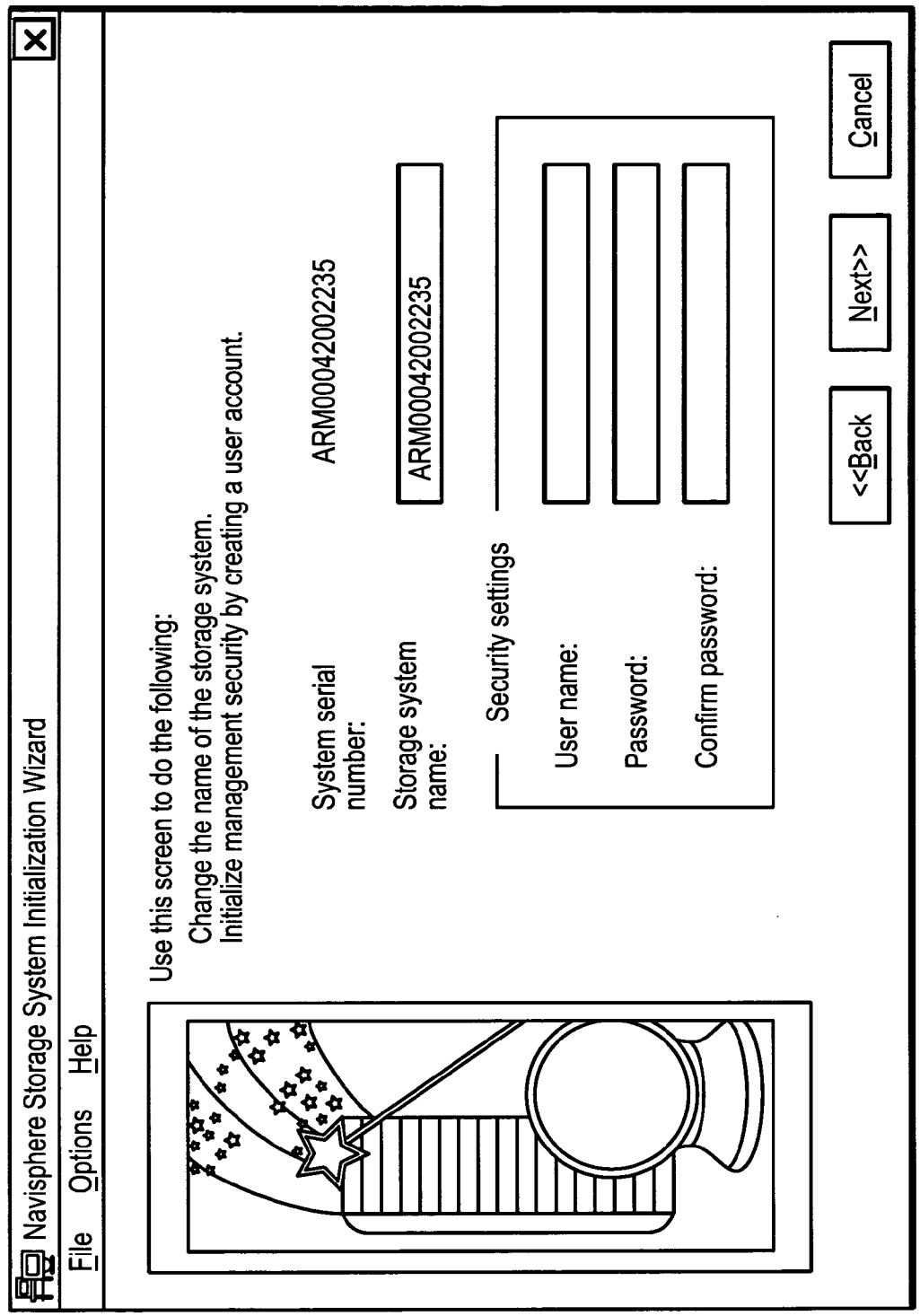

Next displayed is a name and security settings page (e.g., as shown in FIG. 6) that allows the user to enter the storage system name and set the username/password (step 3080).

Figure 7:
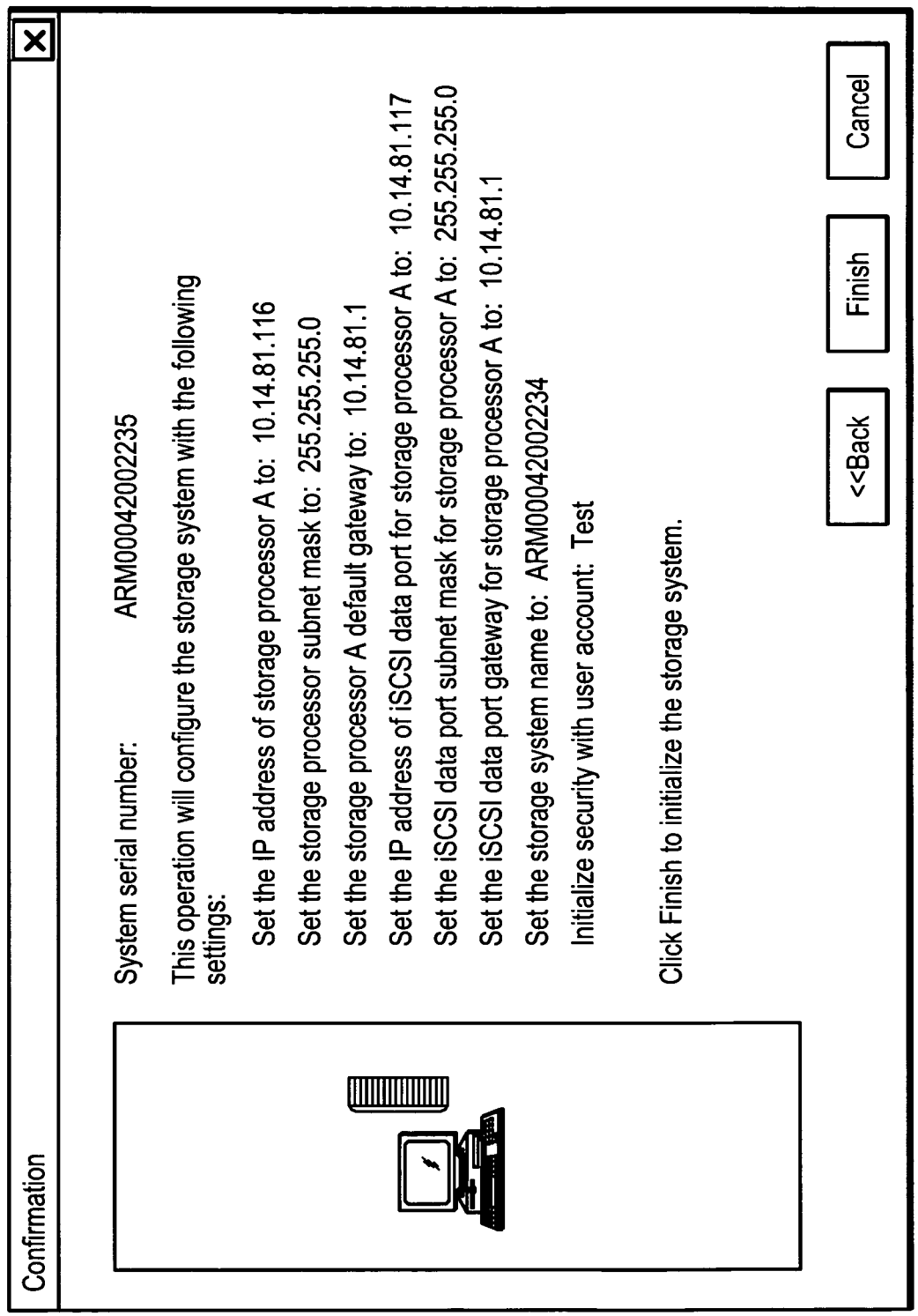

A confirmation page (e.g., as shown in FIG. 7) is displayed showing the iSCSI data port information (step 3090). In at least one embodiment, the screen text is scrollable, if necessary, and a link is provided to allow the user to launch a Web browser pointing to the storage system that was just initialized so that the user can configure Challenge Response Authentication (CHAP) functionality if the user chooses to do so.

Upon confirmation, a results page is provided after configuration to display the results of the initialization operation (step 3100).

Figure 18A:
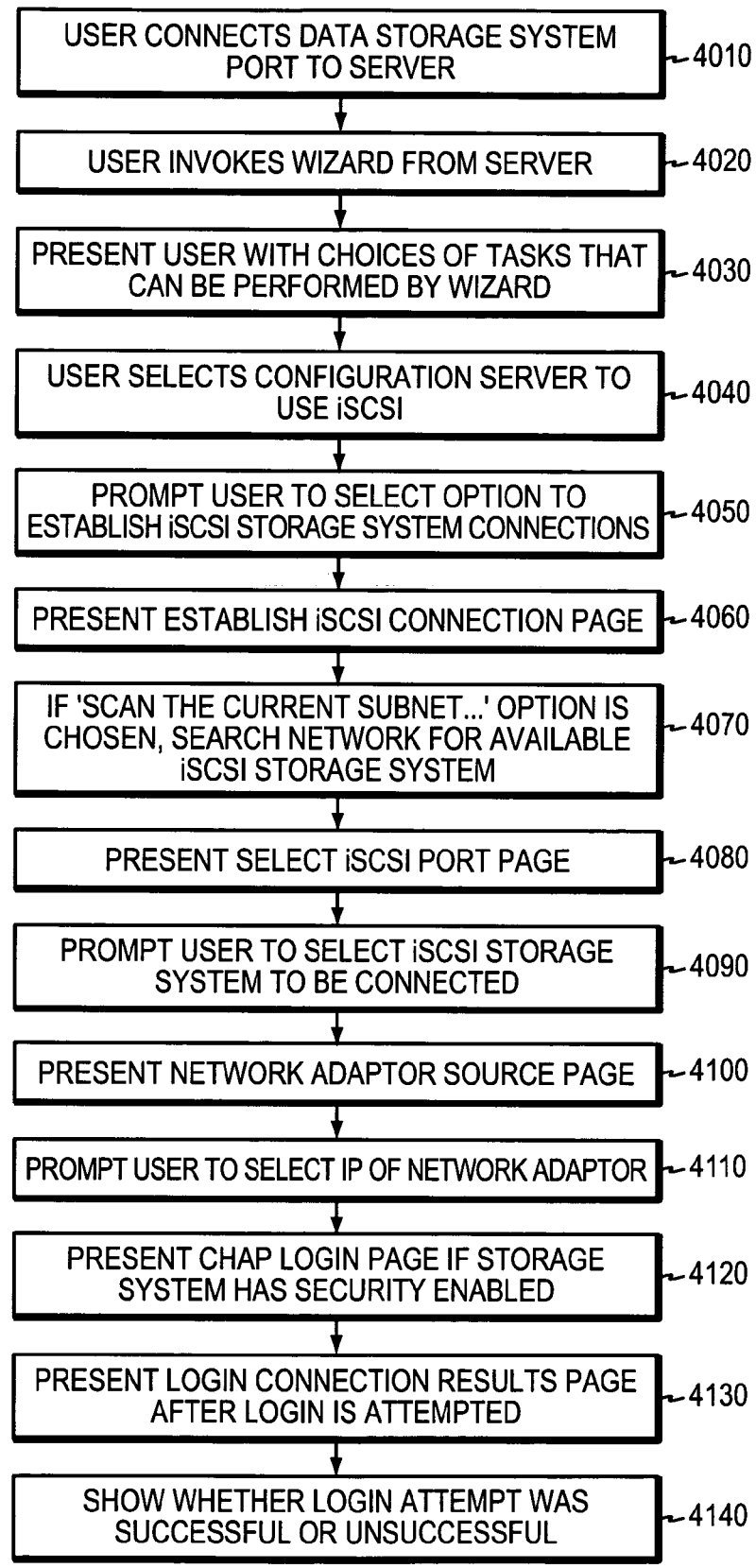
Figure 18B:
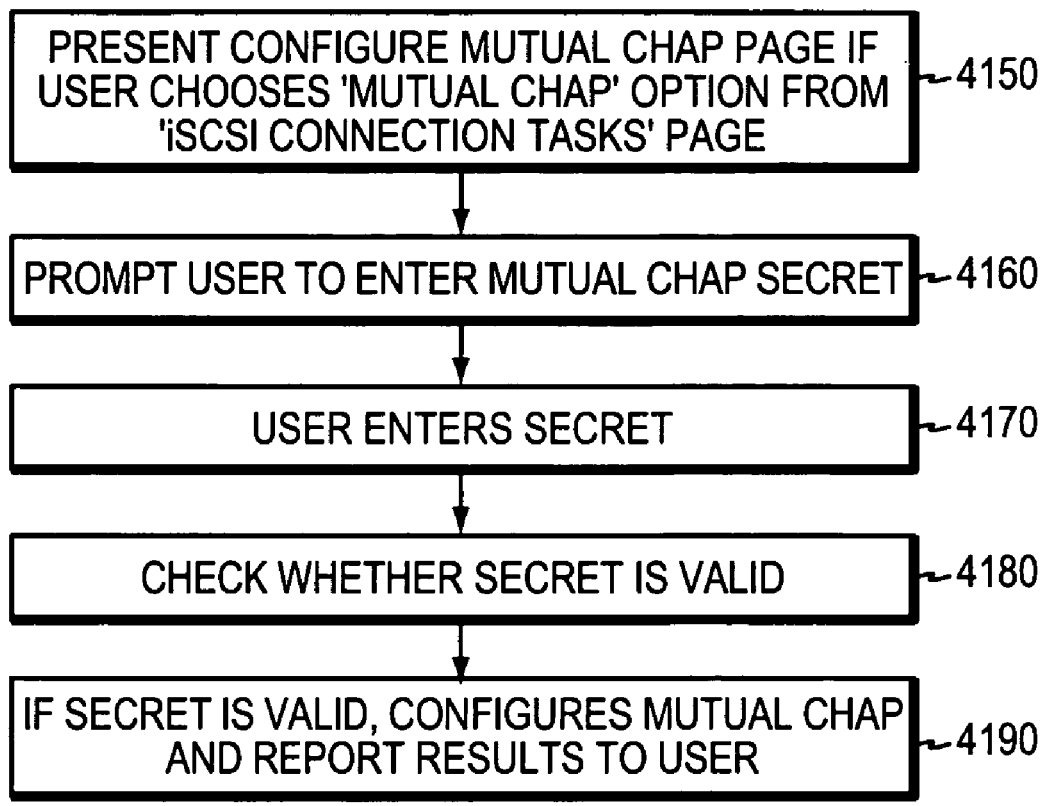

FIGS. 18A-18B illustrate configuring the server to use iSCSI, particularly the flow of operations and data for configuring MICROSOFT Initiator software 170 and interface 150 so that storage can be allocated to the server. In a sample embodiment, a management software server utility wizard serving as server utility tool 190 is used to configure the server to use the iSCSI storage system. The wizard is a MICROSOFT Foundation Class (MFC) graphical user interface (GUI) application running on WINDOWS, and configures the server and registers it with the storage system. The wizard has the ability to configure an initiator on the server without requiring the user to interact directly with the MICROSOFT Initiator software 170. FIGS. 8-16 illustrate a sample of each screen used, in order, to configure an initiator on the server in the sample embodiment.

The user connects data storage system port 140 to the server (step 4010), e.g., using cables, and invokes the wizard from the server (step 4020).

Figure 8:
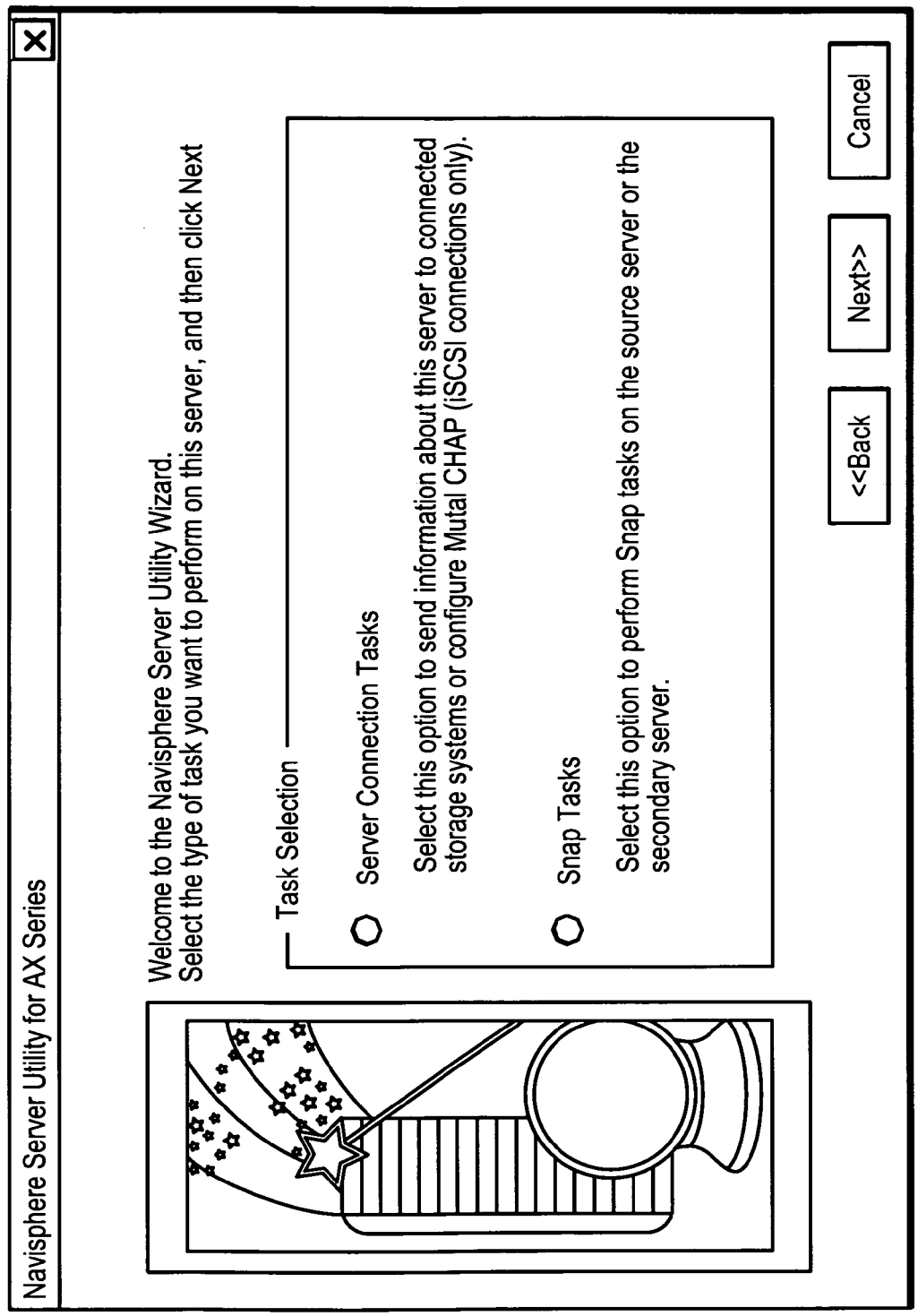
Figure 9:
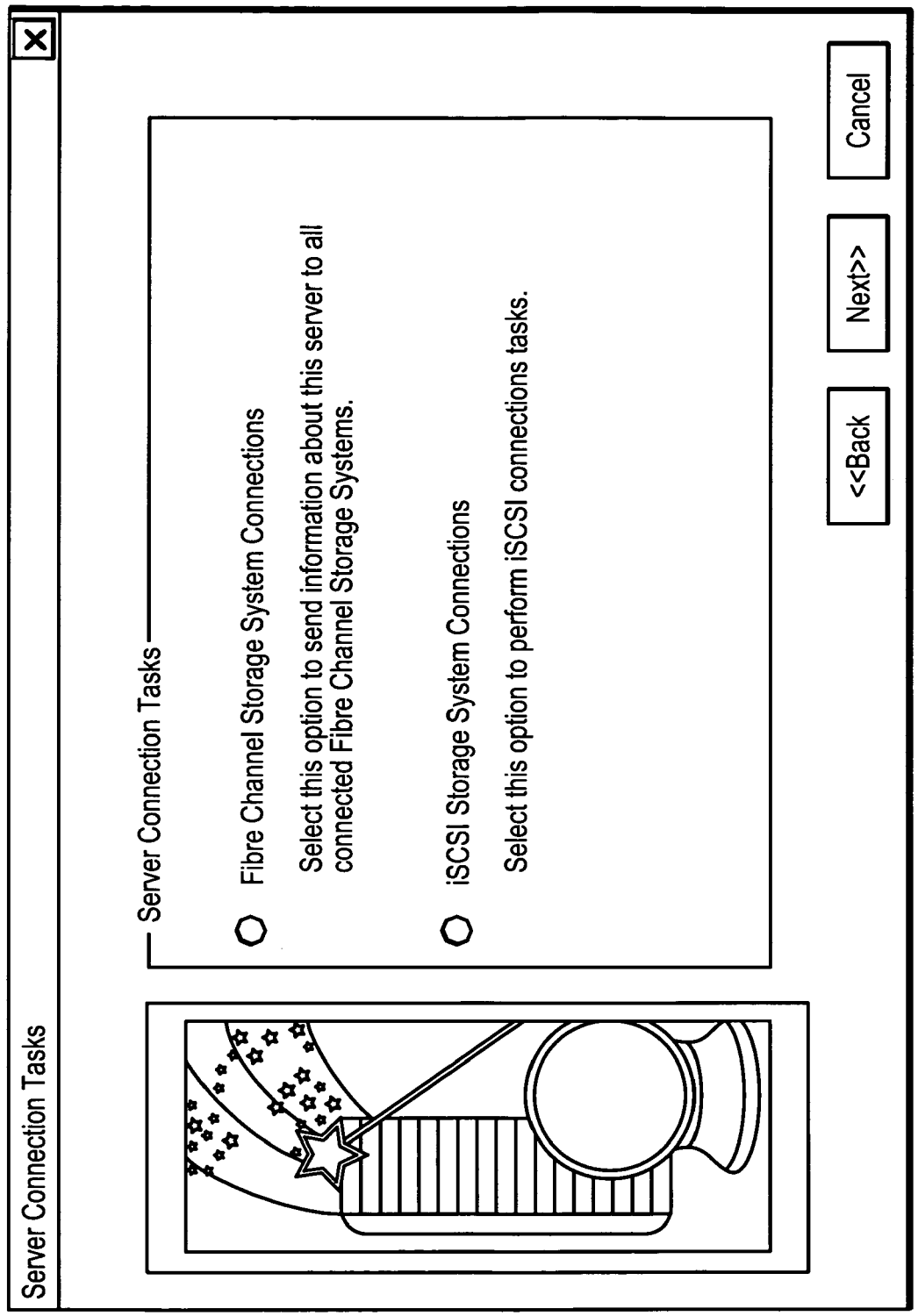

A welcome page (e.g., as shown in FIG. 8) of the wizard presents the user with the choices of tasks that can be performed by the wizard (step 4030). For configuring the server to use iSCSI or to configure mutual CHAP, the user selects the first option (step 4040), which causes display of a server connections tasks page (FIG. 9) that gives the user the option to configure Fibre Channel or iSCSI connections. When the user then selects option 'iSCSI Storage System Connections', an iSCSI connection tasks page (FIG. 10) is displayed (step 4050) that gives the user the option to establish iSCSI storage system connections by starting an iSCSI discovery session or, as described below, to configure mutual CHAP.

With respect to establishing iSCSI connections, an establish iSCSI connection page (FIG. 11) is presented (step 4060) if the user chooses the 'iSCSI Storage System Connections' choice on the previous page. The user is presented with three options to establish iSCSI connections. If a 'Scan the current subnet . . . ' option is chosen, the wizard searches the network for available EMC iSCSI storage systems (step 4070). The 'Use the following iSCSI port IP address . . . ' and 'Use the following iSNS IP address . . . ' options are available to allow the user to enter directly the IP address of the desired connection. This page is derived using the following functionality described below: AddIScsiSendTargetPortal, AddISNSServer, RemoveIScsiSendTargetPortal.

With respect to selecting an iSCSI port, a select iSCSI port page (FIG. 12) follows the 'Establish iSCSI Connections' page (step 4080). The iSCSI storage systems that were discovered are listed on this page which allows the user to select the iSCSI storage systems to be connected (step 4090). This page is derived using the following functionality described below: GetIScsiSessionList, ReportIScsiTargets, GetIScsiTargetInformation, LogoutIScsiTarget, RemoveIScsiSendTargetPortal, RemoveIScsiPersistentTarget.

A network adaptor source page (FIG. 13) follows the 'Select iSCSI Port' page (step 4100), and enables the user to select the IP of the network adaptor (e.g., interface 150 that the user would like to use for the connection to be established (step 4110). This page is derived using the following functionality described below: LoginIScsiTarget.

After the user has selected a storage system from the previous step, a CHAP login page (FIG. 14) is shown if the storage system has security enabled (step 4120). This page is derived using the following functionality described below: RemoveIScsiSendTargetPortal.

A login connection results page (FIG. 15), which is displayed after a login is attempted to a storage system (step 4130), presents the results of the login attempt and shows whether the login attempt was successful or unsuccessful (step 4140). If the login attempt was unsuccessful, the user can choose to proceed back to fix the problem if possible.

FIG. 18B illustrates a flow of operations and data that occurs when configuring mutual CHAP. A configure mutual CHAP page (FIG. 16) is displayed if the user chooses the 'Mutual CHAP' option from the 'iSCSI Connection Tasks' page (step 4150). The page allows the user to configure mutual CHAP on the server. Under mutual CHAP authentication, the initiator can log on only to targets that know the initiator secret. This page is derived using the following functionality described below: SetIScsiInitiatorCHAPSharedSecret.

Figure 10:
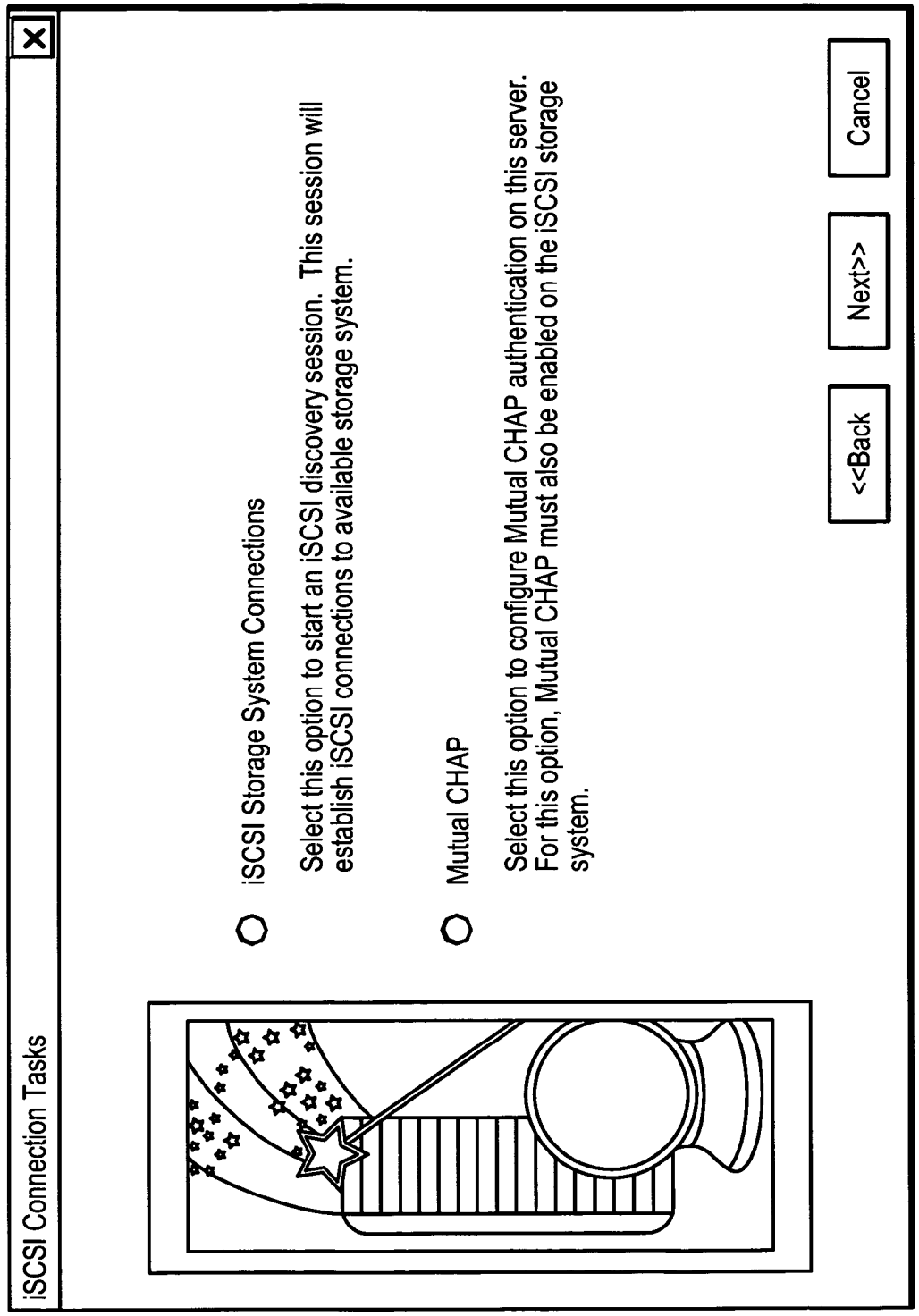
Figure 11:
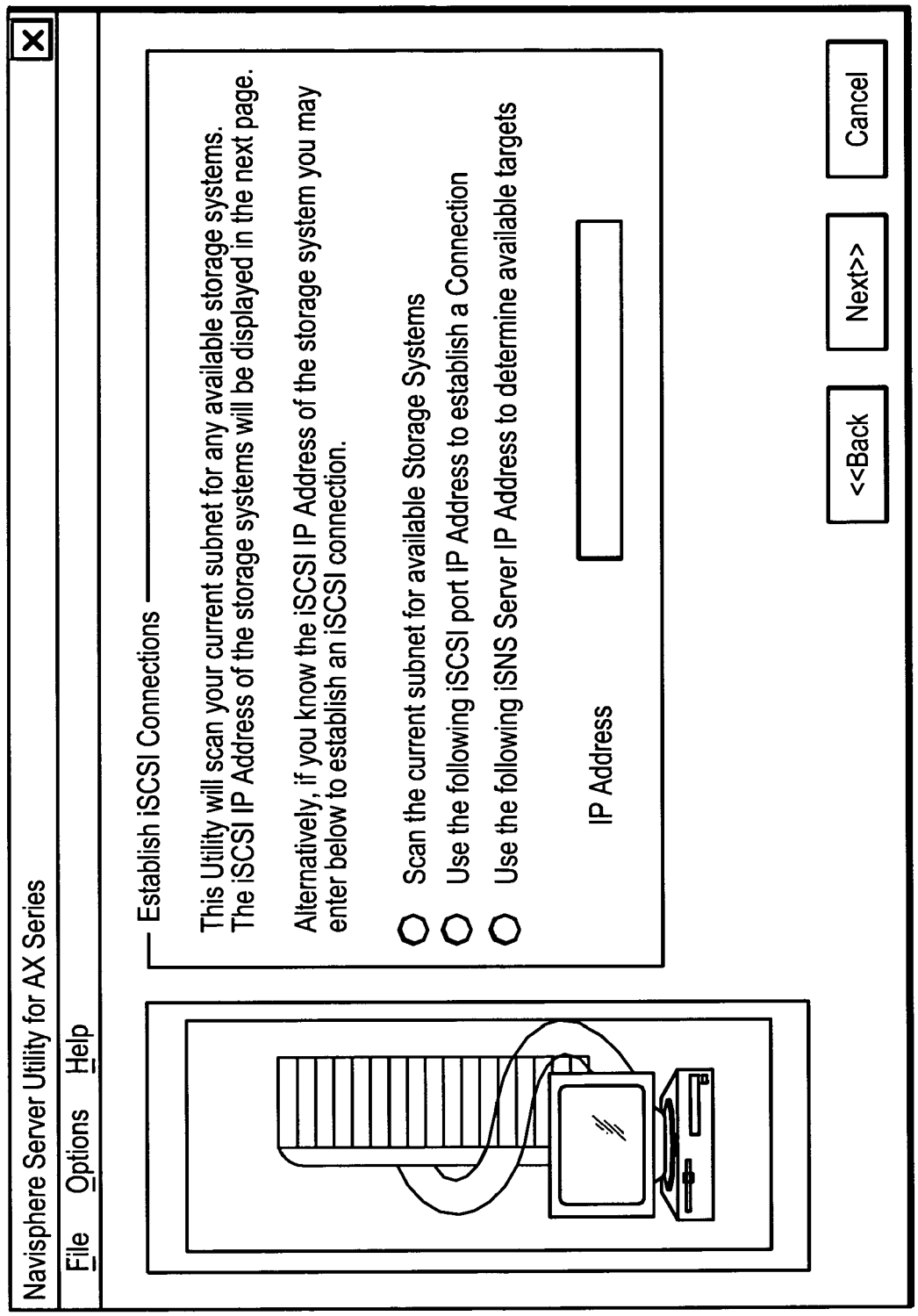
Figure 12:
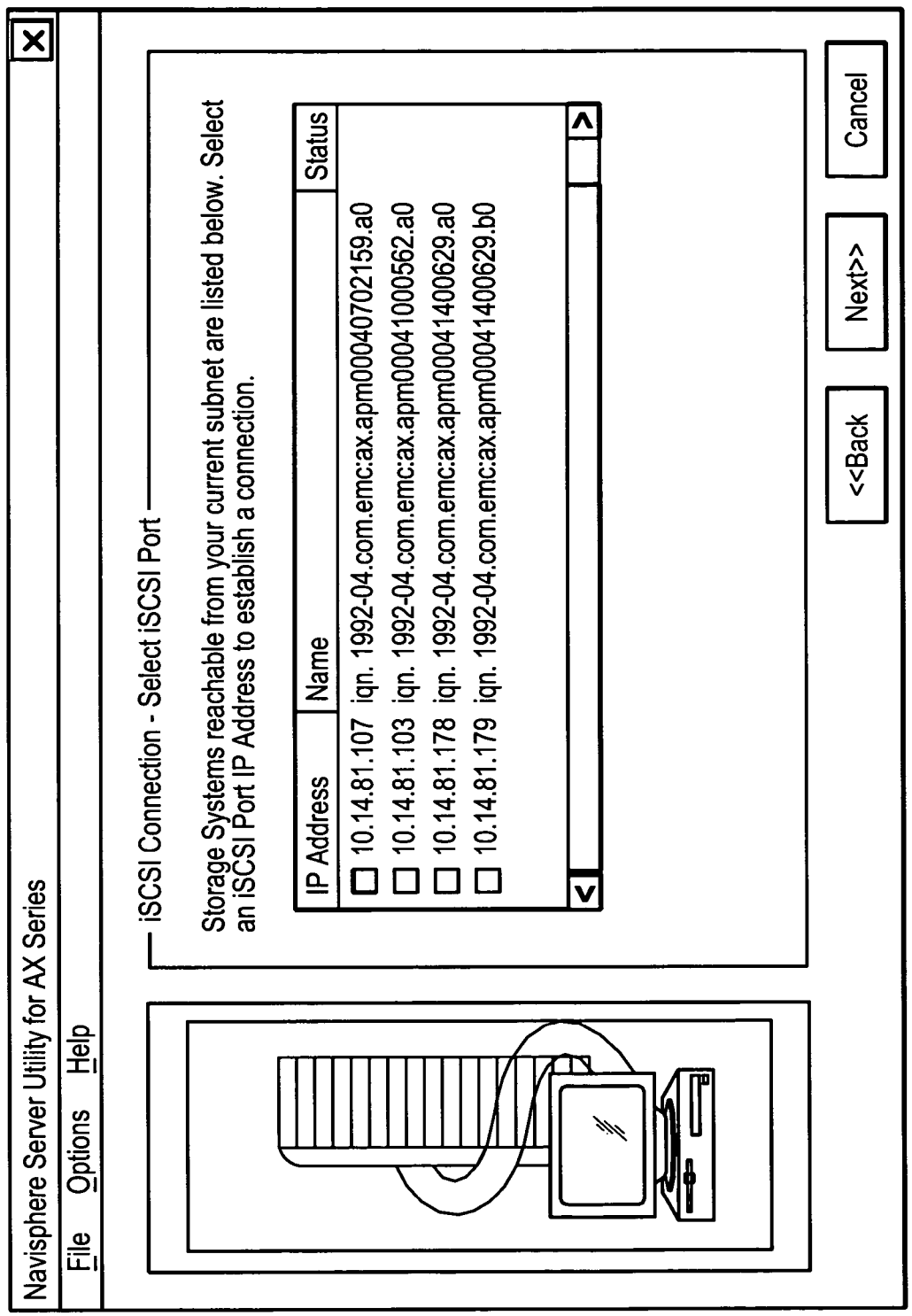
Figure 13:
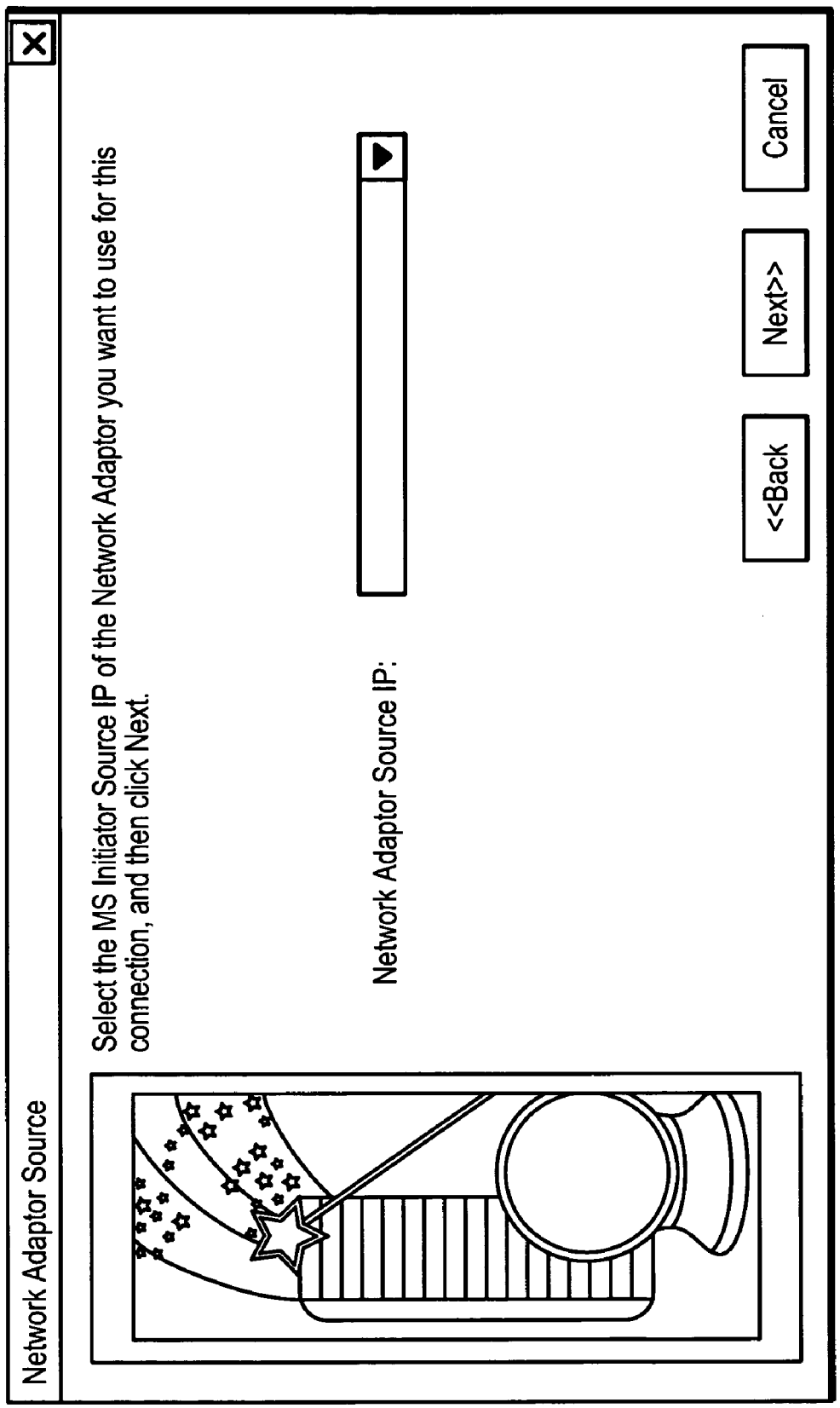
Figure 14:
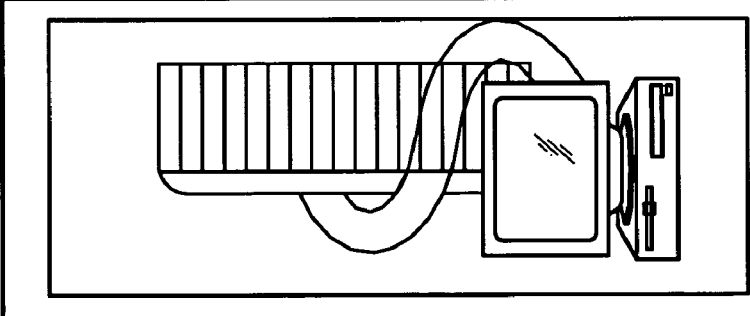
Figure 15:
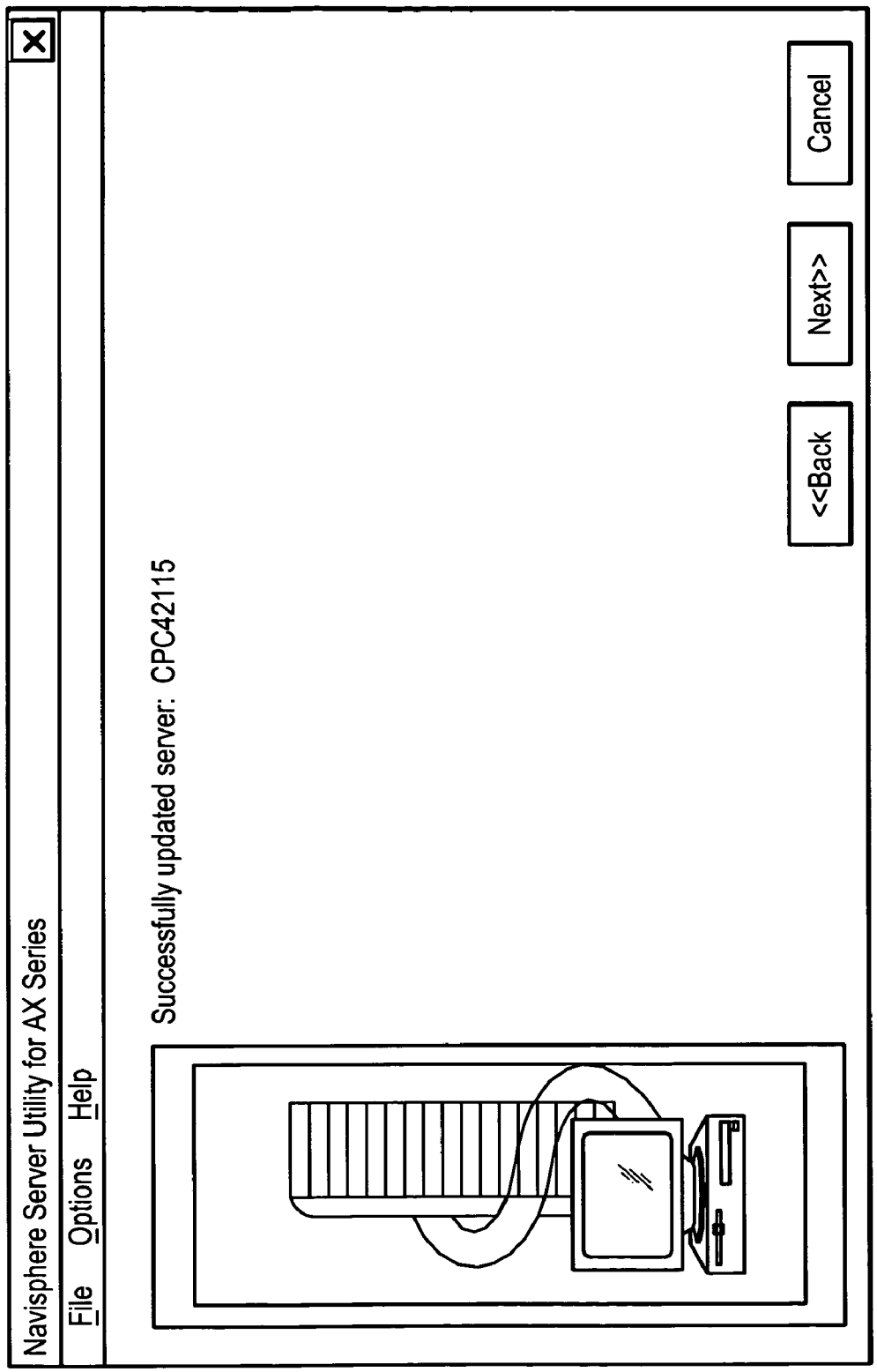
Figure 16:
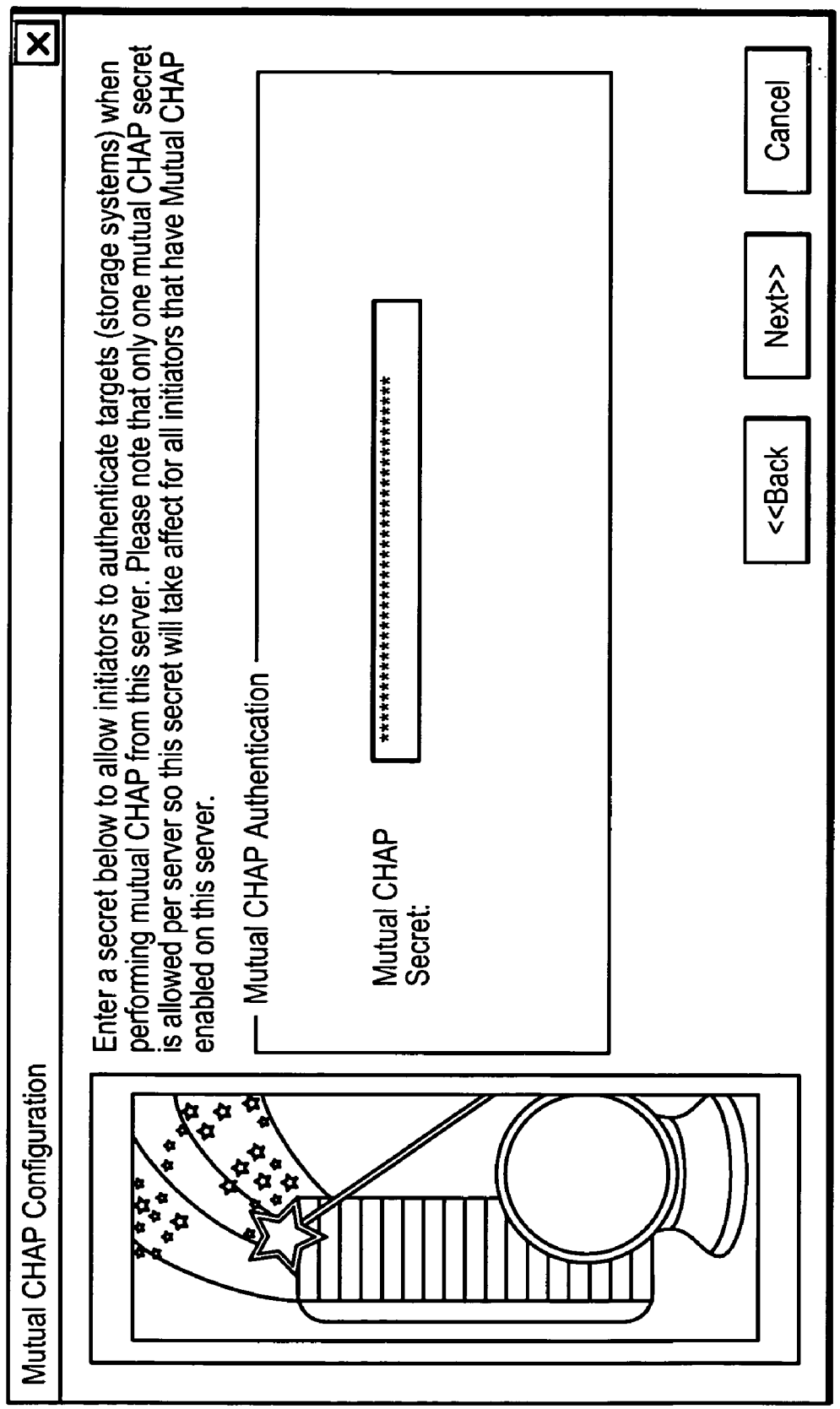

In a sample embodiment, the flow may start from FIG. 10 as described above. The server utility prompts the user to enter the mutual CHAP secret (step 4160) (FIG. 15). After the user enters the secret (step 4170), the server utility checks whether the secret is valid (e.g., has a valid number of characters) (step 4180) and if the secret is valid the server utility configures mutual CHAP and reports the results to the user (step 4190).

Aspects of server utility 200 are particularly useful for helping the user to easily establish server to storage system iSCSI connections. In general, the server utility is used to "push" server information to connected storage systems. The aspects of the server utility as described herein help enable the user to establish connections through the server utility.

In a sample embodiment, the server utility is implemented largely as a stand alone executable software program running on the server. The aspects described herein act as a pre-step to registering the server with the data storage system. In the sample embodiment, the storage system supports the iSCSI 1.0 specification and can be reached from the server. Further in the sample embodiment, MICROSOFT Initiator Service is running on the host and the server has network interface 150. In a particular embodiment, if the user indicates affirmatively to a prompt about whether a connection to an iSCSI storage system will be attempted, MICROSOFT Initiator Service is installed automatically, e.g., by the server utility.

The server utility includes functionality provided by three major components: a server utility MFC client on a WINDOWS host, a server utility command line interface on all platforms, and a set of APIs responsible for gathering information about the server and pushing the information to the storage system. As described herein, the server utility includes APIs responsible for adding targets of an iSCSI connection (iSCSI targets) and establishing connections to the storage system, such as the server utility MFC client providing a user interface to the application and a server utility client API responsible for gathering information about the server and pushing the information to the storage system. In many cases, the storage system serves as the iSCSI target from the server, and in some cases, vice-versa.

Aspects helpful for iSCSI connecting including the following logic. Class iscdsc.h defines iSCSI portal information and iSCSI calls to MICROSOFT Initiator Service. Class iscdsc.h is part of the MICROSOFT Initiator software developer's kits (SDK) and requires the same version of MICROSOFT Initiator Service on the server. The data and methods exported are used by an iSCSICommandHelper class (described below) to establish iSCSI connections and login to the storage system. Exported routine AddIScsiSendTargetPortal is a method to establish a discovery session and direct a SendTarget operation to a specified target portal. Method AddIScsiSendTargetPortal takes parameters InitiatorName and InitiatorPortNumber specifying the name of the initiator from which to direct a SendTarget operation and the port on the initiator. Method AddIScsiSendTargetPortal further takes parameters LoginOptions, SecurityFlags, and Portal, respectively specifying login options to be used, security flags for the SendTarget operation, and the target portal to which the discovery session is established and the SendTarget operation is directed. A Status value is returned indicating successful completion or an iSCSI error code such as ISDSC_CONNECTION_FAILED (connection failed to the specified target), ISDSC_INITIATOR_ERROR (initiator is not correctly configured), or ISDSC_SERVICE_UNAVAILABLE (initiator service is not available).

Exported routine RemoveIScsiSendTargetPortal is a method to remove a specified target portal from the list of target portals on which SendTarget operation is performed whenever an iSCSI service refreshes the list or the service is restarted. Method RemoveIScsiSendTargetPortal takes parameters InitiatorName, InitiatorPortNumber, and Portal respectively specifying the name of the initiator to be removed, the port number on the initiator, and the target portal which is to be removed from the list of targets, and produces a return value for status indicating successful completion or error, such as ISDSC_SERVICE_UNAVAILABLE (initiator service is not available).

Exported routine LoginIscsiTarget is a method to login to the specified target and establish a session. The session can be a persistent one such that it is re-established whenever the system is rebooted. The method takes parameters TargetName and IsInformationalSession respectively specifying the name of the target to log into and indicating (by Boolean) an informational session. The method further takes parameters InitiatorName, InitiatorPortNumber, and TargetPortal respectively specifying the name of the initiator, the port number on the initiator to initiate the session login, and the portal to use to login to the target. The method further takes parameters LoginOptions and IsPersistant respectively specifying login options for the session and indicating (by Boolean) a persistent session. The method produces return values SessionID specifying a unique ID to the session established, and ConnectionID specifying a unique ID of the connection. Error conditions that may be returned include ISDSC_LOGIN_FAILED (login failure), ISDSC_SERVICE_UNAVAILABLE (iSCSI service is not available), and ISDSC_TARGET_NOT_FOUND (target was not found or is hidden from login).

Exported routine LogoutIscsiTarget is a method to logout a session from a target. The method takes a parameter SessionID specifying a session ID to logout from, and produces a return value ERROR_SUCCESS indicating a success code or an iSCSI error code such as ISDSC_SERVICE_UNAVAILABLE (iSCSI service is not available).

Exported routine ReportIscsiTargets is a method to determine targets discovered by MICROSOFT Initiator Service. The method takes a parameter ForceUpdate which is a Boolean indicating whether the list of targets should be updated/refreshed. The method also takes parameters BufferSize and Buffer respectively specifying a size in bytes of a buffer passed in, and the content of the buffer, i.e., the list of targets. Each target is delimited by a null termination and the last target is indicated by a double null termination. The method produces a return value ERROR_SUCCESS that is a success code or an iSCSI error code such as ISDSC_SERVICE_UNAVAILABLE indicating that iSCSI service is not available.

Exported routine GetIscsiTargetInformation is a method to retrieve specific information about a target, and takes a parameter TargetName specifying the name of the target. The method also takes parameters DiscoveryMechanism and InfoClass respectively specifying a mechanism by which the target was discovered and the type of information to be retrieved. The type may include protocol type, target alias, portal groups, discovery mechanisms, initiator name, persistent target mappings. The method produces a return value ERROR_SUCCESS specifying a success code or an iSCSI error code such as ISDSC_SERVICE_UNAVAILABLE (initiator service is not available).

AddiSNSServer is a method (part of MICROSOFT Initiator) that can be used to add a new server to the list of iSNS servers used by the MICROSOFT initiator service (iscsiexe.exe) to discover targets. When a new iSNS server is added to its list of servers, the method immediately refreshes its list of discovered targets by contacting the newly added server and requesting a list of the targets that the server has discovered. Method AddiSNSServer takes one parameter: a pointer to a string that contains the DNS or IP Address of the server. A Status value is returned indicating successful completion or an iSCSI error code such as ERROR_INVALID_PARAMETER or ERROR_ISNS_SERVER_NOT_FOUND.

GetIScsiSessionList is a method (part of MICROSOFT Initiator) that can be used to retrieve the list of active iSCSI sessions. GetIScsiSessionList takes parameters BufferSize, SessionCount, and SessionInfo that provide a pointer to a value that contains the size of the SessionInfo buffer, a pointer to the value containing the number of session structures, and a pointer to the buffer that contains the contiguous structures, respectively. The method returns a success value if successful, otherwise an error such as ERROR_INSUFFICIENT_BUFFER (the buffer is too small to hold all the sessions).

RemoveIssciPersistentTarget is a method (part of MICROSOFT Initiator) that can be used to remove a target from the list of targets that the MICROSOFT Initiator service automatically logs on after the computer starts. RemoveIscsiPersistentTarget takes parameter TargetName that indicates the name of the target. The method returns a success value if successful, and otherwise returns an appropriate error message.

SetIScsiInitiatorCHAPSharedSecret is a method (part of MICROSOFT Initiator) that can be used to set the CHAP shared secret for all initiators on the computer. This shared secret is used by all initiators, when indicated, to authenticate targets. SetIScsiInitiatorCHAPSharedSecret takes two parameters, SharedSecretLength and SharedSecret that indicate the size in bytes of the shared secret and a pointer to a buffer that contains the shared secret respectively. A success value is returned if the operation is successful, otherwise an appropriate error message is returned.

Class iSCSICommandHelper is a helper class to execute calls on MICROSOFT Initiator Service and process the error messages returned. In particular, this class includes helper functions to facilitate the interface to MICROSOFT Initiator Service. The class includes static methods which are called from NSUWizardAvailableTargets and NSUWizardAddConnection (classes used to represent different pages of the wizard) to establish an iSCSI connection and login sessions to a target. Exported routine iSCSICommandhelpen:addTargetPortal( ) is a method to issue a iSCSI SendTarget operation against the passed target and add it to the list of targets discovered. The method takes parameter targetportal specifying the target portal to which to direct the SendTarget operation and produces a return value for status indicating a success message or an error code.

Exported routine iSCSICommandhelper:: removeTargetPortal( ) is a method to remove the target from the list of targets discovered and takes parameter targetportal specifying the target portal to be removed. The method produces a return value for status indicating a success message or an error code.

Exported routine iSCSICommandhelper:: getListOfTargets( ) is a method to determine the current list of targets discovered and to which MICROSOFT Initiator Service would direct a iSCSI SendTarget operation upon refresh. The method produces a return value NAVValSlist<ISCSI_TARGET_PORTAL> which includes a list of targets currently discovered.

Exported routine iSCSICommandhelper:: LoginTarget( ) is a method to login to the target passed in and establish a session. The method takes parameter Target specifying the name of the target to log into and produces a return value for status indicating a success message or an error code.

Exported routine iSCSICommandhelper:: LogoutTarget( ) is a method to logout a session from the specified target and takes parameter Target which is the name of the target to log out from. The method produces a return value for status indicating a success message or an error code.

Exported routine iSCSICommandhelper:: GetCurrentLogins( ) is a method to obtain a list of current persistent login sessions, and produces a return value TargetList which is a list of targets to which a persistent iSCSI session has been established.

The server utility also includes a thread ScanSubnetThread to issue iSCSI SendTarget and discover targets. If the connection fails, this thread also issues a Remove SendTarget operation to the target and removes it from the list of targets to be refreshed by MICROSOFT Initiator Service. For each portal in the subnet, NSUWizardAvailableTargets instantiates a ScanSubnetThread and executes it. Exported routine ScanSubnetThread:: execute( ) is the execute method of the thread, and invokes AddIScsiSendTargetPortal and RemoveIscsiSendTargetPortal. If appropriate the method responds that the target portal does not exist and/or a connection to the target address cannot be established.

Other embodiments are within the scope of the following claims. For example, the server tool and/or the initialization tool may reside and/or be executed from outside the server. An initiator device driver for an HBA may be used. The network may be or include the Internet, a wireless network, and/or a local area network. Configuration may be further automated by additional functionality that automatically supplies input described above as being user supplied.

What is claimed is:

1. A method for use in managing communications connections with data storage systems, the method comprising:

executing a discovery process to identify one or more iSCSI ports on a data storage system from a list of data storage systems based on a first user selection between Fibre Channel and iSCSI, and further based on a second user selection, wherein the user may select among providing an iSCSI IP address, an iSNS Server IP address, wherein the discovery process includes scanning a network to produce the list of data storage systems reachable from a current subnet and, displaying a results page including the list of data storage systems, wherein a data storage system of the list of data storage system is represented in the results page by an icon and a serial number;

selecting the data storage system from the list of data storage systems displayed on the results page for configuring the one or more identified iSCSI ports on the data storage system;

selecting one of the one or more identified iSCSI ports on the data storage system;

selecting a network interface to initiate a connection with the data storage system;

accepting, as user input at a server, settings for the selected iSCSI port; and communicating from the server to the data storage system using the selected network interface to configure the selected iSCSI port.

2. The method of claim 1, further comprising:
prompting a user to select the data storage system.

3. The method of claim 1, further comprising:
prompting a user to enter management port settings.

4. The method of claim 1, further comprising:
determining whether the data storage system is an iSCSI data storage system.

5. The method of claim 1, further comprising:
prompting a user to enter a storage system name and set a username/password.

6. The method of claim 1, further comprising:
displaying a confirmation page showing iSCSI data port information.

7. The method of claim 1, further comprising:
displaying a results page showing results of configuration.

8. A system for use in managing communications connections with data storage systems, the system comprising:

first logic executing a discovery process to identify one or more iSCSI ports on a data storage system from a list of data storage systems based on a first user selection between Fibre Channel and iSCSI, and further based on a second user selection, wherein the user may select among providing an iSCSI IP address, an iSNS Server IP address, wherein the discovery process includes scanning a network to produce the list of data storage systems reachable from a current subnet and, displaying a results page including the list of data storage systems, wherein a data storage system of the list of data storage system is represented in the results page by an icon and a serial number;

second logic selecting the data storage system from the list of data storage systems displayed on the results page for configuring the one or more identified iSCSI ports on the data storage system;

third logic accepting a selection of one of the one or more identified iSCSI ports on the data storage system;

fourth logic accepting a selection of a network interface to initiate a connection with the data storage system;

fifth logic accepting, as user input at a server, settings for the iSCSI port; and sixth logic communicating from the server to the data storage system to configure the iSCSI port;

seventh logic prompting a user to enter a storage system name and set a username/password.

9. The method of claim 8, further comprising:
seventh logic prompting a user to select the data storage system.

10. The method of claim 8, further comprising:
seventh logic prompting a user to enter management port settings.

11. The method of claim 8, further comprising:
seventh logic determining whether the data storage system is an iSCSI data storage system.

12. The method of claim 8, further comprising:

* * * * *